United States Patent
Sueshige et al.

(10) Patent No.: US 7,407,023 B2
(45) Date of Patent: Aug. 5, 2008

(54) STEERING APPARATUS FOR WORKING MACHINE

(75) Inventors: Hiroshi Sueshige, Wako (JP); Seishu Sakai, Wako (JP)

(73) Assignee: Honda Motor Co., Ltd. (JP)

( * ) Notice: Subject to any disclaimer, the term of this patent is extended or adjusted under 35 U.S.C. 154(b) by 454 days.

(21) Appl. No.: 11/262,330

(22) Filed: Oct. 28, 2005

(65) Prior Publication Data

US 2006/0096791 A1    May 11, 2006

(30) Foreign Application Priority Data

Oct. 29, 2004    (JP)    ............... 2004-315981

(51) Int. Cl.
B62D 11/14    (2006.01)
(52) U.S. Cl. .................... 180/6.34; 180/6.32
(58) Field of Classification Search ............ 180/6.34, 180/6.32, 6.4
See application file for complete search history.

(56) References Cited

U.S. PATENT DOCUMENTS

| 4,341,129 | A | * | 7/1982 | Bando | .................. | 74/481 |
|---|---|---|---|---|---|---|
| 7,152,704 | B2 | * | 12/2006 | Uemura et al. | ............. | 180/6.24 |
| 7,337,870 | B2 | * | 3/2008 | Izukura et al. | ............. | 180/307 |
| 2006/0042840 | A1 | * | 3/2006 | Goto et al. | ................. | 180/6.32 |
| 2007/0235232 | A1 | * | 10/2007 | Hanafusa | ................... | 180/6.32 |

FOREIGN PATENT DOCUMENTS

JP        55129169        9/1980

* cited by examiner

*Primary Examiner*—Tony H. Winner
(74) *Attorney, Agent, or Firm*—Adams & Wilks

(57) ABSTRACT

An assist mechanism of a steering apparatus for a working machine includes right and left operational arm members for selectively engaging and disengaging right and left clutches. Right and left cam grooves are formed in the right and left operational arm members, respectively. A bar-shaped member has opposite ends disposed within the right cam groove and the left cam groove, respectively. A compression spring is disposed along a central axis of the bar-shaped member for urging the right and left operational arm members in directions away from each other.

3 Claims, 13 Drawing Sheets

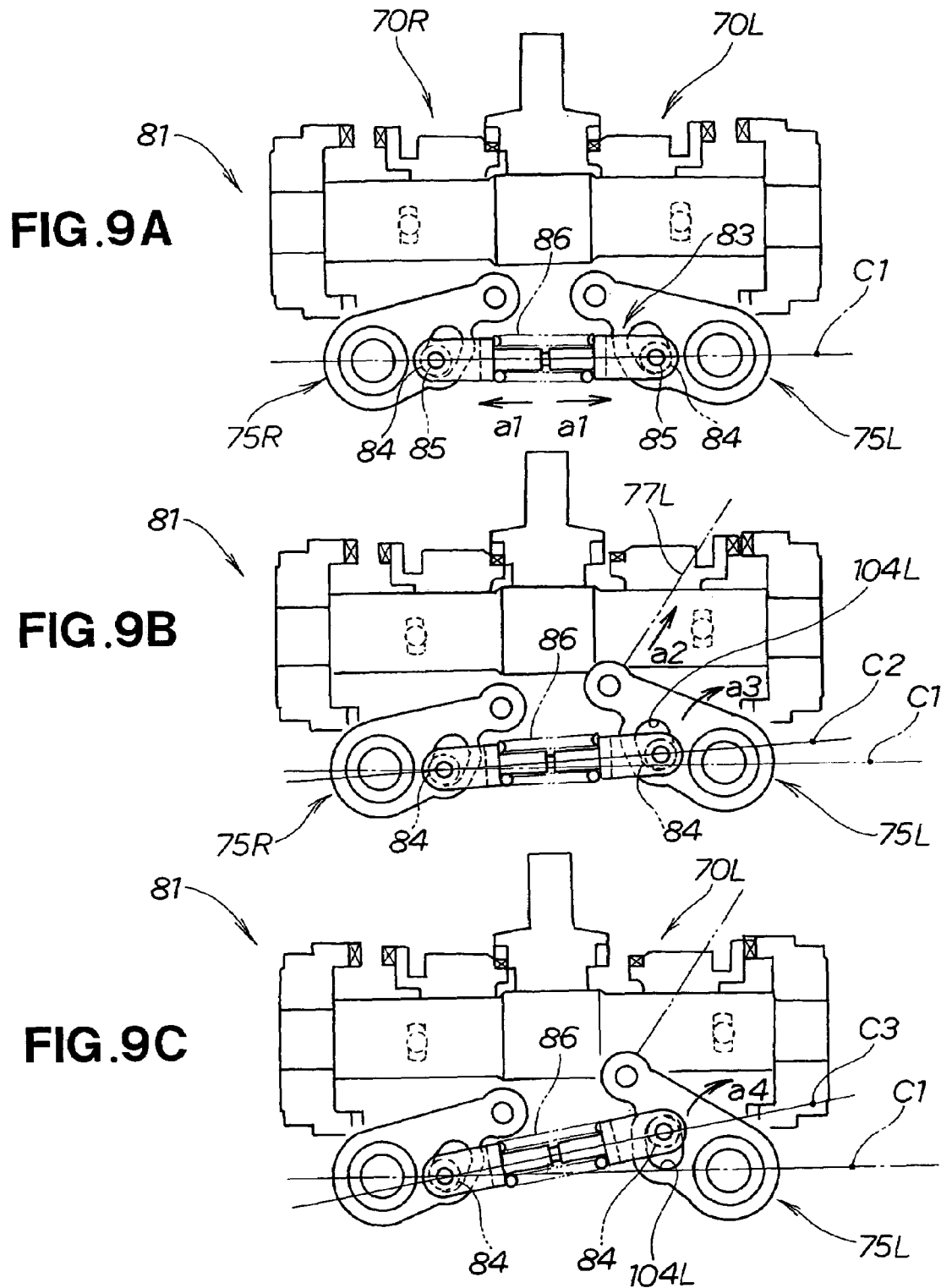

STEERING APPARATUS FOR WORKING MACHINE

FIELD OF THE INVENTION

The present invention relates to a steering apparatus for a working machine, the steering apparatus being designed to provide a reduced force required to operate an operational member such as an operational lever of the working machine.

BACKGROUND OF THE INVENTION

Working machines include steering apparatuses designed to provide reduced forces required to operate operational levers for operating clutches and the like. The steering apparatuses include electric motors, plungers, springs or mechanisms using leverage for reducing force required to operational levers. Such steering apparatuses have assist mechanisms including springs for reducing force required to operate operational levers, as disclosed in JP-U-55-129169.

FIG. 15 hereof illustrates the disclosed assist mechanism 201 with an operational member 204 in a non-operated state and in an operated state.

As shown in FIG. 15, the assist mechanism 201 is used in a working machine or transporting machine. The machine is arranged such that an output from an engine (not shown) is transmitted through a transmission and side clutches (only one shown) 202 to right and left crawler belts.

The assist mechanism 201 includes a first rod member 203 having one end connected to the side clutch 202, and a second rod member 205 having one end connected to the operational member 204. The assist mechanism 201 also includes a pivotal member 206 having one side connected to each of the first and second rod members 203, 205, an intermediate part supported on a shaft, and an opposite side connected to a bar-shaped member 207 movable between a extended position and a contracted position. The bar-shaped member 207 has its distal end supported on a shaft. The bar-shaped member 207 is urged towards the pivotal member 206 by a compression spring 208 disposed along the length of the bar-shaped member 207.

With the thus arranged assist mechanism 201, a force to operate the operational member 204 can be reduced. It is to be noted that the operational member 204 shown in part (b) of FIG. 15 is in a pulled position located a distance S away from a position shown in part (b) of FIG. 15.

The first and second rods 203, 205, the pivotal member 206, the bar-shaped member 207 and the compression spring 208 are required for connection of the operational member 204 to the side clutch 202. Since the side clutch 202 is provided at each side of the machine body, the first rod member 203, each of the second rod member 205, the pivotal member 206, the bar-shaped member 207 and the compression spring 208 is provided in pair. That is, the assist mechanism 201 undesirably requires the increased number of components. The increased number of the components undesirably occupies a larger space.

SUMMARY OF THE INVENTION

An object of the present invention is to provide a steering apparatus for a working machine made from the reduced number of components.

According to one aspect of the present invention, there is provided a steering apparatus for a working machine having a machine body, a motive power source and right and left driving shafts, the steering apparatus comprising: right and left clutches for transmitting rotation of the motive power source to the right and left driving shafts; an assist mechanism; right and left operational members for operating the right and left clutches, respectively, through the assist mechanism to steer the machine body of the working machine; the assist mechanism including: right and left operational arm members mounted on the machine body and connected to the right and left operational members, respectively, such that the right operational arm member pivots for selectively engaging and disengaging the right clutch when the right operational member is operated and the left operational arm member pivots for selectively engaging and disengaging the left clutch when the left operational member is operated; right and left cam grooves formed in the right and left operational arm members, respectively; a movable bar-shaped member having opposite ends disposed within the right and left cam grooves, respectively; and a compression spring disposed along a central axis of the bar-shaped member for urging the right and left operational arm members in directions away from each other, wherein, when one of the right and left operational members is operated, one of the right and left operational arm members, connected to the one of the right and left operational members, undergoes a pivotal movement to cause the bar-shaped member to undergo a movement along one of the right and left cam grooves formed in the one of the right and left operational arm members, the movement of the bar-shaped member and the urging of the compression spring assisting the pivotal movement of the one of the right and left operational arm members.

The assist mechanism is formed by the reduced number of components including the operational arm members, the cam grooves, the bar-shaped member and the compression spring. The reduced number of the components occupies a reduced space. In addition, the number of components of the working machine can be reduced and therefore the working machine can be made at a reduced cost.

With the thus arranged mechanism, the operational member can be operated by a reduced force.

Preferably, each of the opposite ends of the bar-shaped member is provided with one of a roller and a ball bearing. Since a coefficient of friction between the one of the roller and the ball bearing and a wall of the cam groove is small, each of the right and left ends of the bar-shaped member can undergo smooth movement. Therefore, the working machine can be smoothly steered.

Preferably, the assist mechanism further includes right and left cables interconnecting the right operational member and the right operational arm member and interconnecting the left operational member and the left operational arm member.

BRIEF DESCRIPTION OF THE DRAWINGS

A certain preferred embodiment of the present invention will hereinafter be described in detail, by way of example only, with reference to the accompanying drawings, in which:

FIG. 9A through FIG. 9C are views showing an operation of the assist mechanism when the working machine turns leftward;

DETAILED DESCRIPTION OF THE PREFERRED EMBODIMENTS

Figure 1:
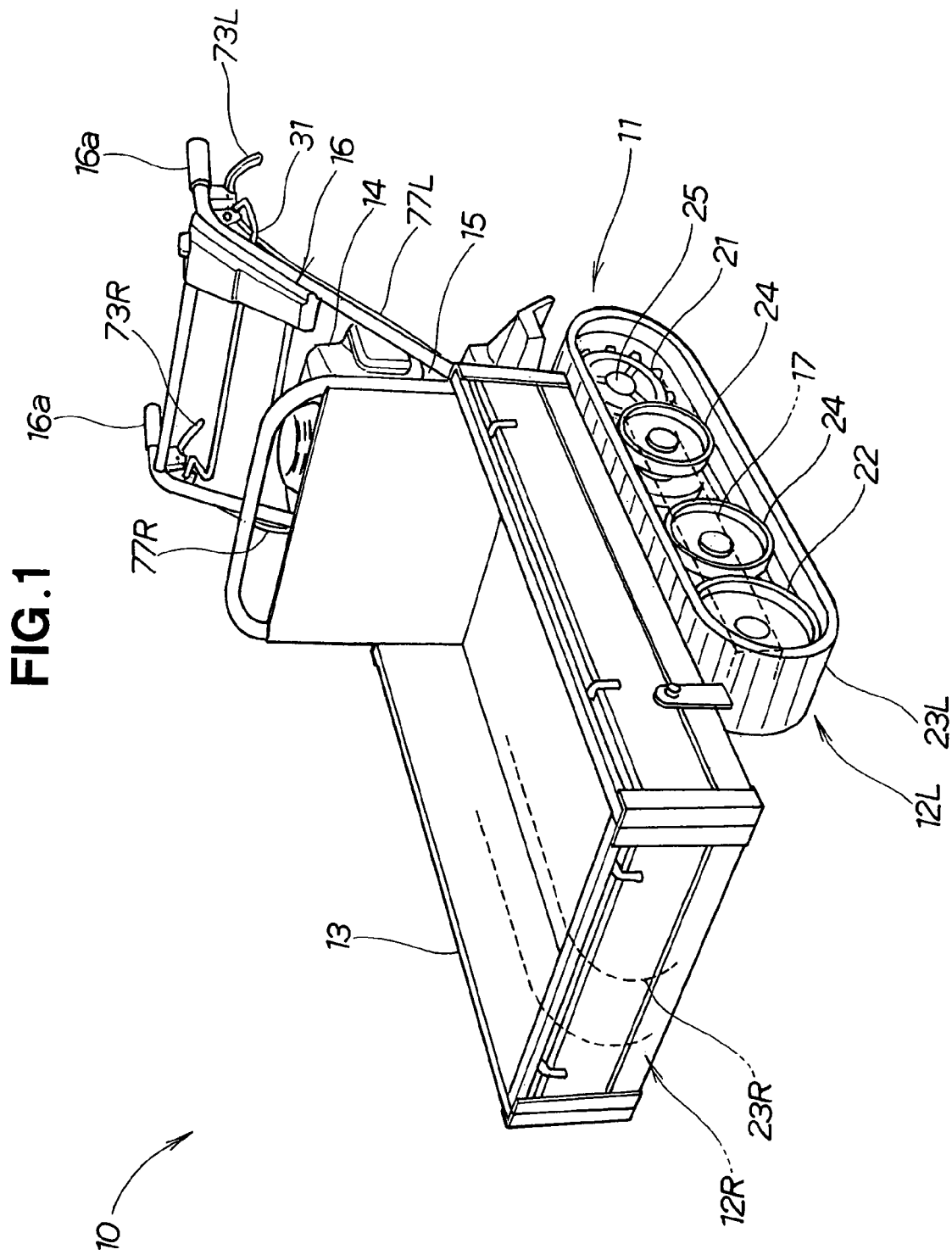
FIG. 1 is a perspective view of a working machine including a steering apparatus according to the present invention.

FIG. 1 illustrates in perspective a working machine 10 employing a steering apparatus 80 (not shown in FIG. 1) according to the present invention. The working machine 10 is a transporting machine including two crawler belt apparatuses 12R, 12L attached to right and left sides of a machine body frame 17, respectively, a carrier 13 attached to an upper part of the machine body frame 17, a motive power source (an engine) 14 and a transmission apparatus 15 both attached to a rear part of the machine body frame 17, and operational handles 16, 16 extending upwardly rearward from the transmission apparatus 15.

The working machine 10 is self-propelled. More specifically, the right and left crawler belt apparatuses 12R, 12L are driven by the engine 14 to propel the working machine 10. During the propulsion of the working machine 10, a human operator holds the handles 16, 16 to steer the working machine 10 while walking behind the working machine 10. Reference numeral 11 denotes a machine body of the working machine 10.

Figure 2:
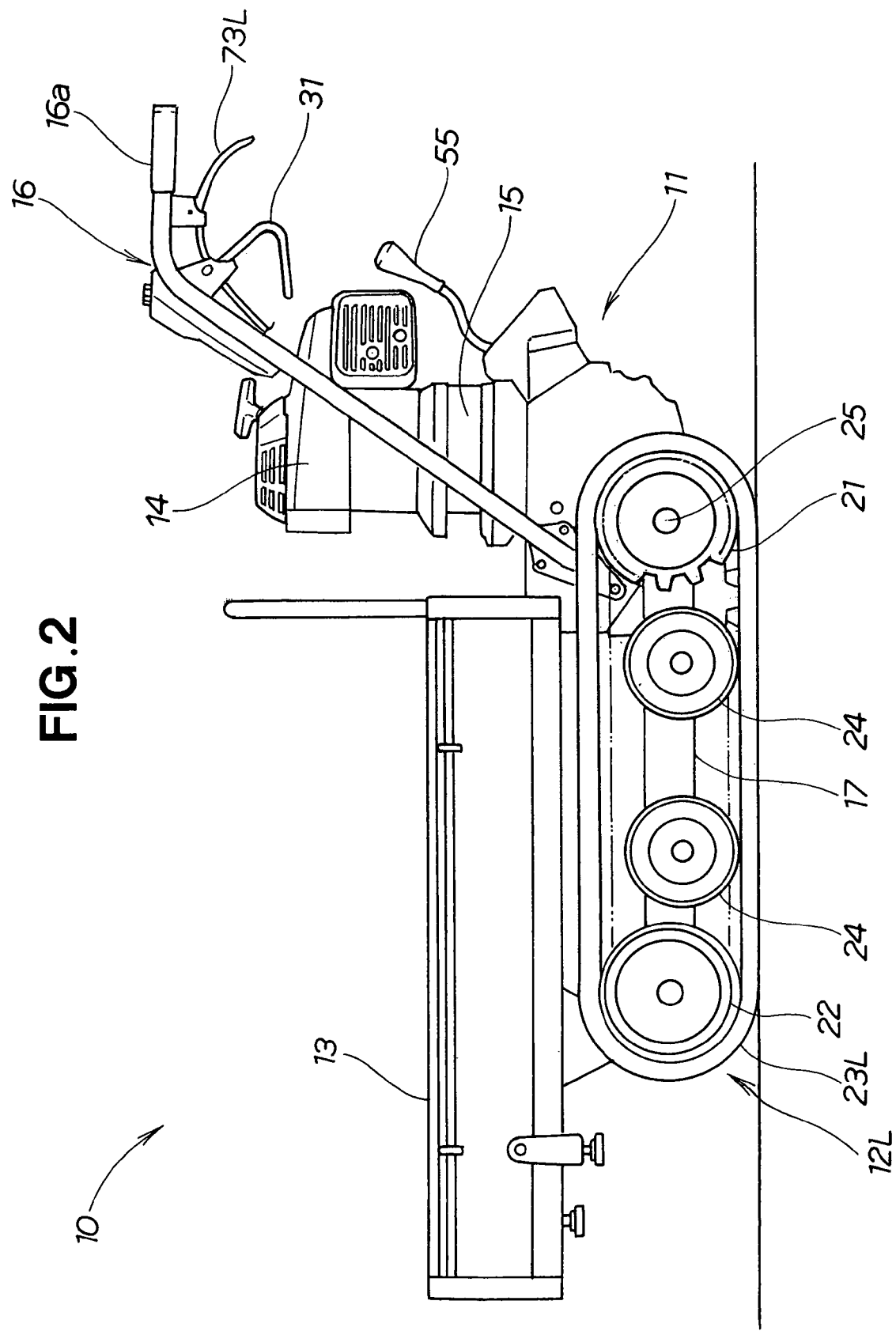
FIG. 2 is a side elevation view of the working machine shown in FIG. 1.

Referring to FIG. 2, the left crawler belt apparatus 12L includes a driving wheel 21 attached to the rear part of the machine body frame 17, an idle wheel 22 attached to a front part of the machine body frame 17, and a left crawler belt 23L extending around the driving wheel 21 and the idle wheel 22. It is to be noted that the right crawler belt apparatus 12R has the same arrangement as the left crawler belt apparatus 12L, and the right crawler belt 23R has the same arrangement as the left crawler belt 23L.

Right and left operational levers (right and left operational members) 73L, 73R (the right one shown in FIG. 1) are provided in vicinities of grips 16a, 16a of the handles 16, 16. When the right and left operational levers 73L, 73R are gripped individually, right and left clutches 70R, 70L (FIG. 4) are disengaged, respectively, as will be described later again. Reference numerals 24, 24 denote wheels.

Figure 3:
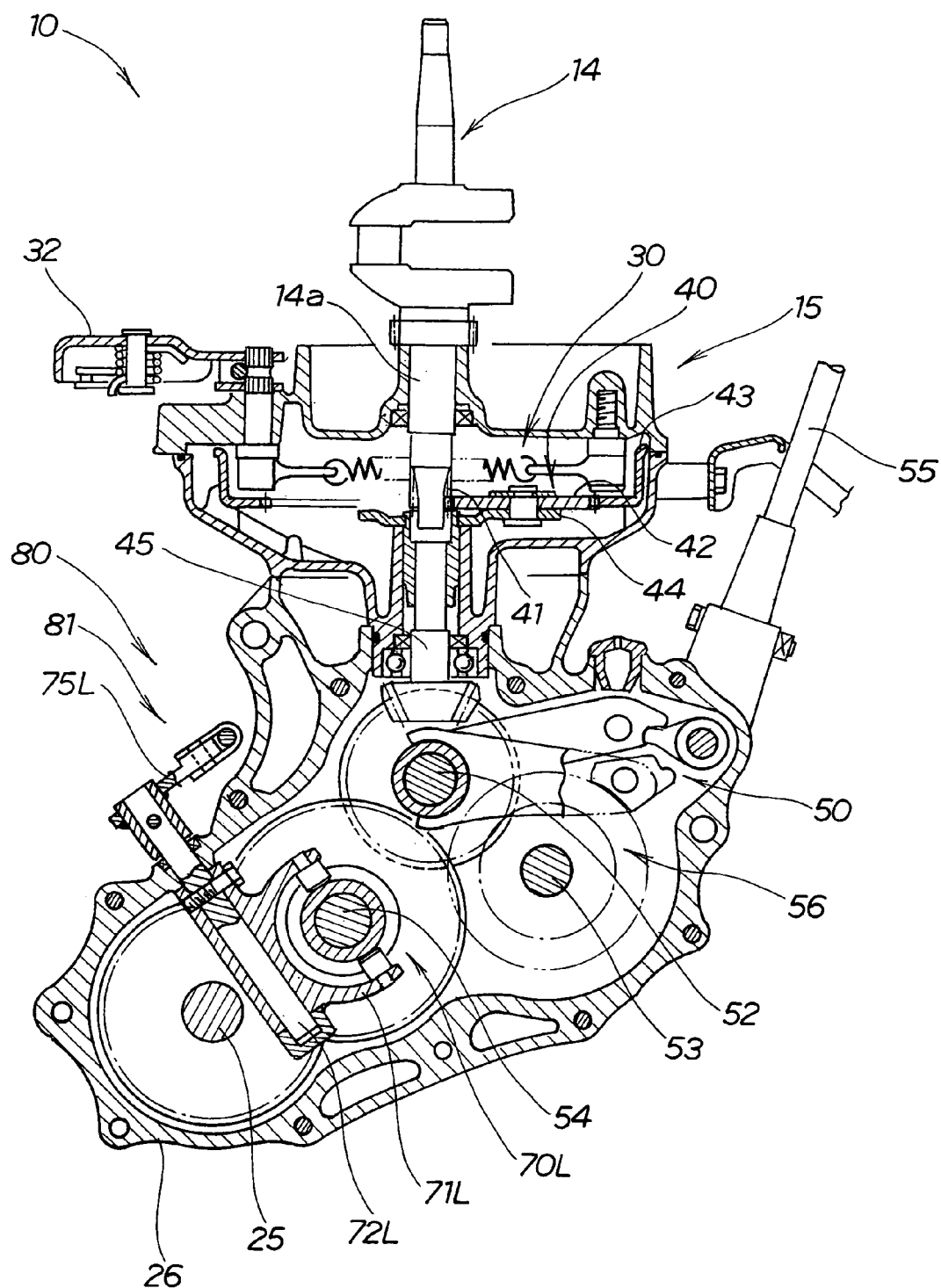
FIG. 3 is a longitudinal cross-sectional view of a transmission apparatus of the working machine.

Turning to FIG. 3, a motive power from the engine 14 is transmitted through the transmission apparatus 15 to the crawler belt apparatuses 12R, 12L. The transmission apparatus 15 includes a main clutch 30, a planetary gear mechanism 40 having an input side connected to a rotational output shaft 14a extending downwardly from the engine 14, a connection shaft 45 (FIG. 4) extending downwardly from an output side of the planetary gear mechanism 40, a gear transmission mechanism 50 connected to the connection shaft 45, and the right and left clutches 70R, 70L. The main clutch 30, the planetary gear mechanism 40, the gear transmission mechanism 50, and the clutches 70R, 70L are all accommodated in a transmission case 26. Right and left driving shafts (axles) 25, 25 are in part accommodated in the transmission case 26. The shafts 25, 25 are rotational shafts connected to the clutches 70R, 70L and to the driving wheels 21, 21 (FIG. 2).

The main clutch 30 selectively allows and stops rotation of an internal gear 43 of the planetary gear mechanism 40. The main clutch 30 has an activating arm 32 connected through a wire cable (not shown) to a main clutch lever 31 attached to the handle 16. The main clutch 30 is operable by the main clutch lever 31.

The planetary gear mechanism 40 includes a sun gear 41 attached to the output shaft 14a, plural planet gears 42 meshing with the sun gear 41, the internal gear 43 meshing with the planet gears 42, and a carrier 44 rotatably supporting the planet gears 42 and connected to the connection shaft 45.

Figure 4:
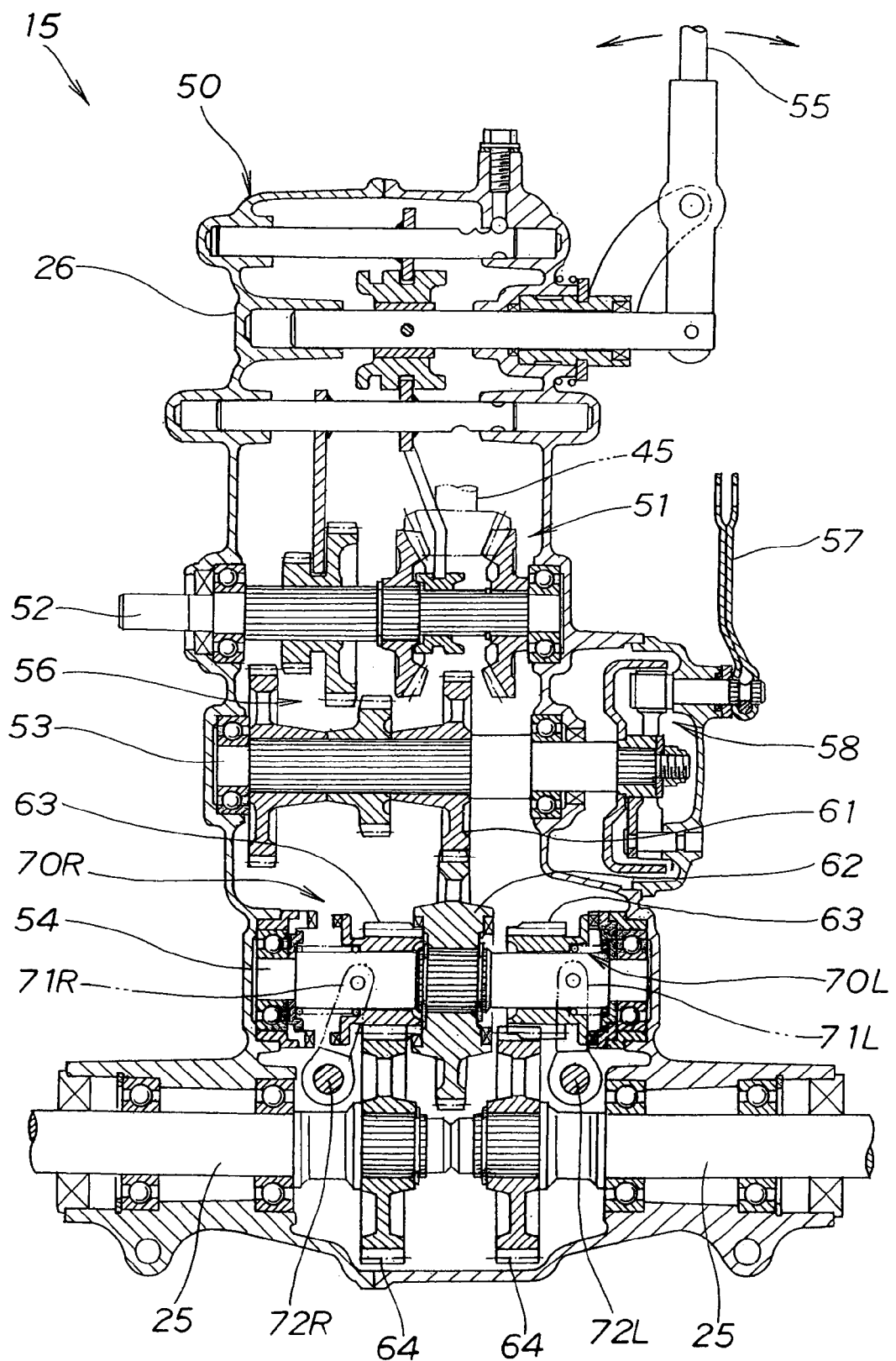
FIG. 4 is a cross-sectional view of a gear transmission mechanism and right and left clutches of the transmission apparatus of the working machine.

Referring to FIG. 4, the gear transmission mechanism 50 includes a bevel gear mechanism 51 connected to the connection shaft 45, a first shaft 52 on which the bevel gear mechanism 51 is mounted, second and third shafts 53, 54 disposed in parallel to the first shaft 52, and a gear mechanism 56. The first shaft 52 extends out of the transmission case 26, such that the motive power of the engine 14 can be taken from the first shaft 52.

The bevel gear mechanism 51 of the gear transmission mechanism 50 includes bevel gears of which rotational directions are switched by a speed change lever 55 to thereby switch a rotational direction of the first shaft 52 between a forward direction and a reverse direction. The speed change lever 55 operates the gear mechanism 56 for varying rotational speed of the second shaft 53. A brake lever 57 is operable to control a drum brake 58 for stopping the rotation of the second shaft 53.

The gear transmission mechanism 50 further includes a first gear 61 mounted on the second shaft 53, and a second gear 62 mounted on the third shaft 54. Since the first gear 61 meshes with the second gear 62, the motive power of the engine 14 can be transmitted from the second shaft 53 to the third shaft 54.

The gear transmission mechanism 50 further includes right and left third gears 63, 63 mounted on the third shaft 54, and right and left fourth gears 64, 64 meshing with the right and left third gears 63, 63, respectively. The third gears 63, 63 are rotatable on and movable axially of the third shaft 54. The right and left fourth gears 64, 64 are mounted on the right and left driving shafts (axles) 25, 25, respectively. The driving shafts 25, 25 are axially aligned with each other. One end of the right driving shaft 25 butts against one end of the left driving shaft 25. The first, second, third and fourth gears 61 to 64 are spur gears.

A right clutch arm 71R is swung to bring the right third gear 63 into and out of meshing engagement with the second gear 62. A left clutch arm 71L is swung to bring the left third gear 63 into and out of meshing engagement with the second gear 62. The right clutch arm 71R is fork-shaped arm member mounted on a right clutch activating shaft 72R while the left clutch arm 71L is a fork-shaped arm member mounted on a left clutch activating shaft 72L.

When the right operational lever 73R (FIG. 1) is operated, the right clutch activating shaft 72R is rotated to swing the right clutch arm 71R for engaging or disengaging the right clutch 70R.

Similarly, when the left operational lever 73L (FIG. 1) is operated, the clutch activating shaft 72L is rotated to swing the clutch arm 71L for engaging or disengaging the left clutch 70L.

Figure 8:
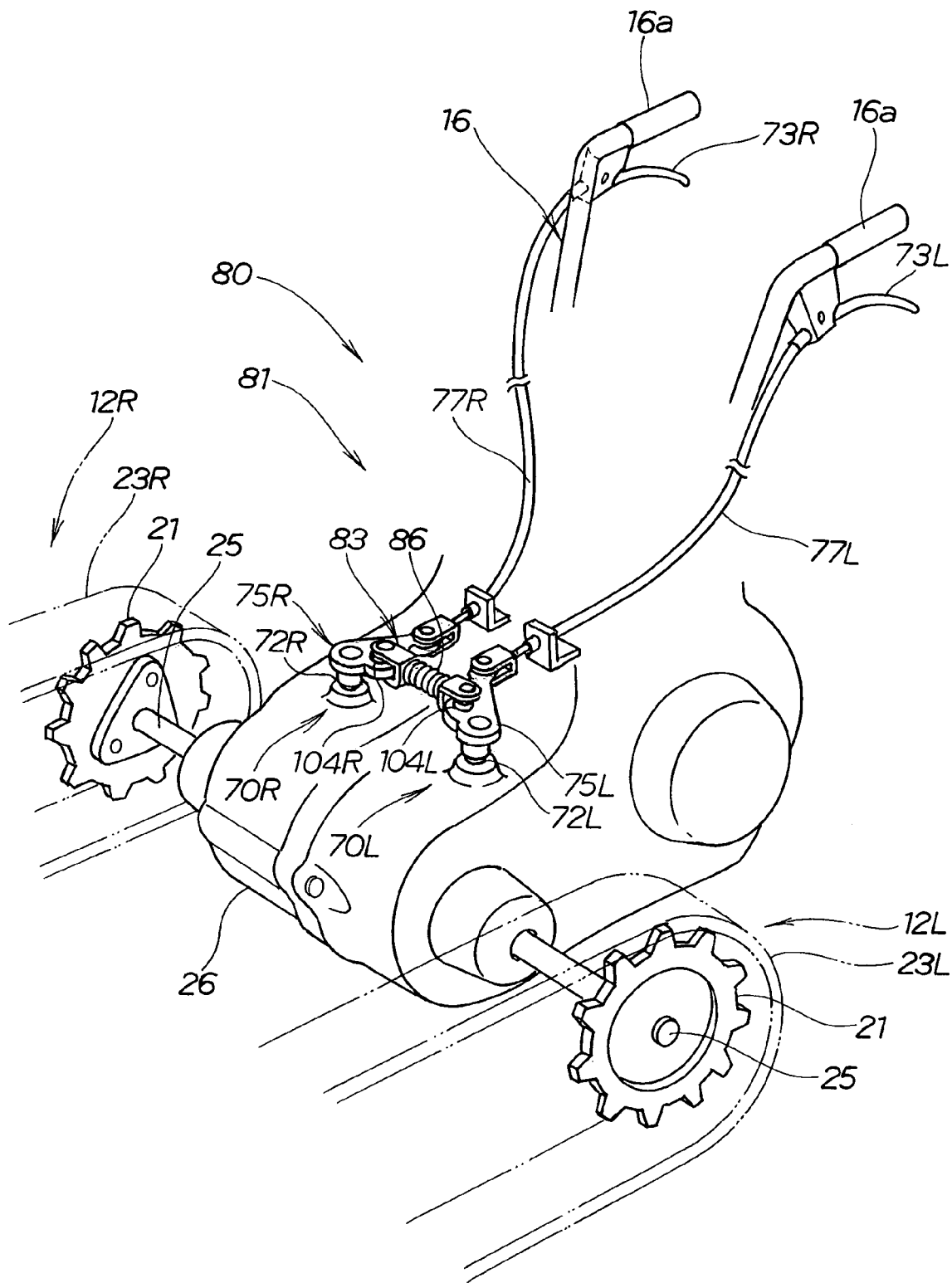
FIG. 8 is a perspective view of the steering apparatus.

Referring to FIG. 8, there is shown the steering apparatus 80 for the working machine 10. The steering apparatus 80 includes the right and left operational levers 73R, 73L, an assist mechanism 81 and the right and left clutches 70R, 70L.

When the left operational lever 73L is gripped, the left clutch 70L is disengaged to stop running of the left crawler belt 23L. In this case, the motive power of the engine 14 is transmitted only to the right crawler belt 23R to thereby cause the working machine 10 to turn leftward.

When the right operational lever 73R is gripped, the right clutch 70R is disengaged to stop running of the right crawler belt 23R. In this case, the motive power of the engine 14 is transmitted only to the left crawler belt 23L to thereby cause the working machine 10 to turn rightward.

Referring back to FIG. 5, the left clutch 70L includes the third gear (driven gear) 63 slidably mounted on the third shaft 54. The third gear 63 has inner and outer projections 65, 66 formed thereon. The left clutch 70L further includes projections 67 formed on the second gear (driving gear) 62 for engagement with the inner projections 65, projections 68 formed on the transmission case 26 for engagement with the outer projections 66, a clutch spring 69 urging the third gear 63 towards the second gear 62, and the clutch arm 71L for shifting the third gear 63 towards the transmission case 26 against the clutch spring 69.

When the left clutch 70L is engaged, the inner projections 65 formed on the third gear 63 engage the projections 67 formed on the second gear 62 for transmitting rotation of the second gear 62 to the third gear 63. When the left clutch 70L is disengaged, the inner projections 65 disengage from the projections 67 for cutting off the transmission of the rotation of the second gear 62 to the third gear 63.

When the left clutch 70L is disengaged, furthermore, the outer projections 66 can engage the projections 68 formed on the transmission case 26 for stopping the rotation of the third gear 63.

The left clutch 70L serves to stop the rotation of the third gear 63 as well as to selectively effect or cut off the transmission of the rotation of the second gear 62 to the third gear 63. The left clutch 70L is called "a dog clutch".

The right clutch 70R has the same arrangement as the left clutch 70L. The right clutch 70R and the left clutch 70L are symmetrically disposed with respect to a central line C.

Figure 5:
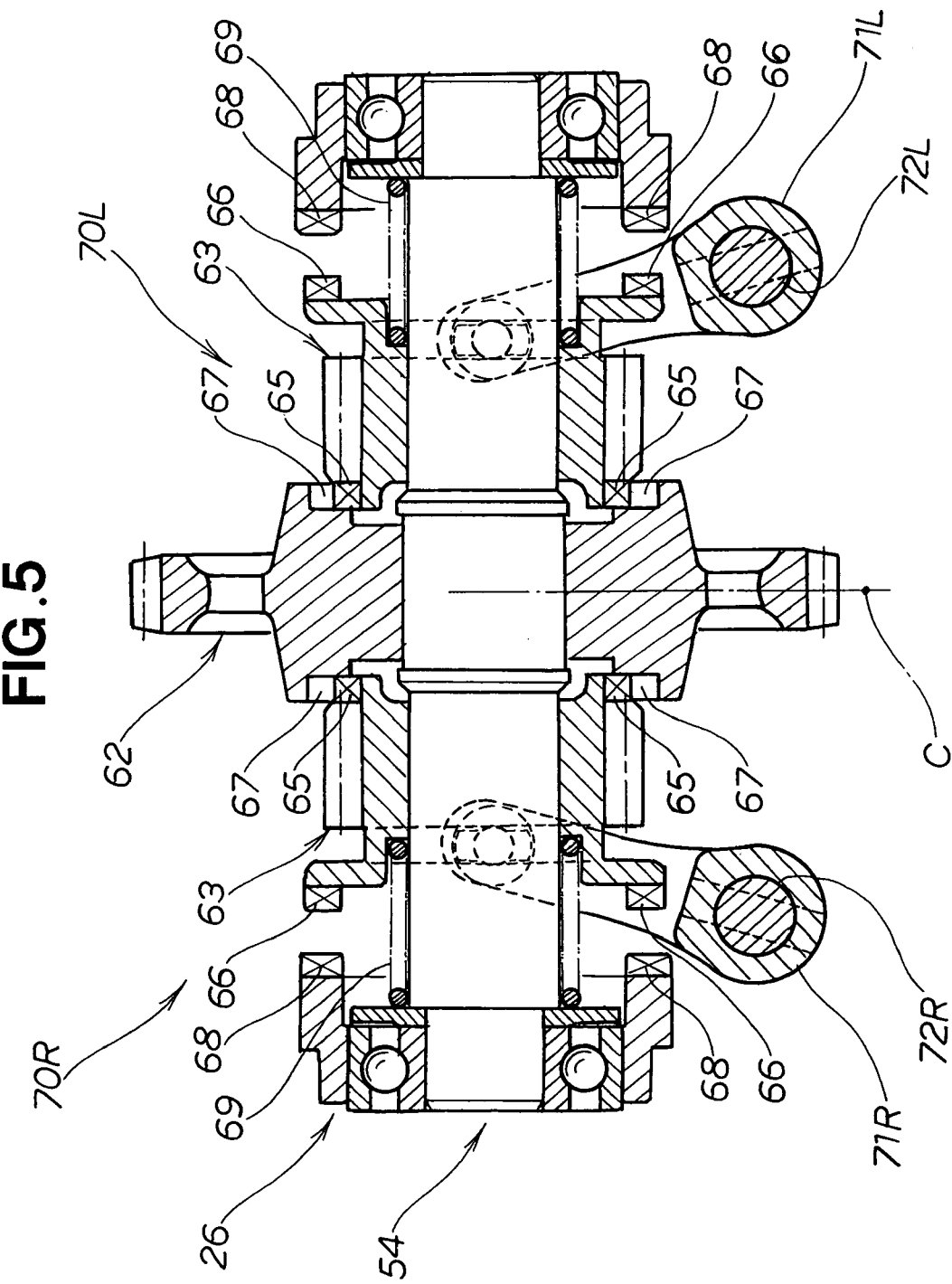
FIG. 5 is an enlarged cross-sectional view of the right and left clutches.
Figure 6:
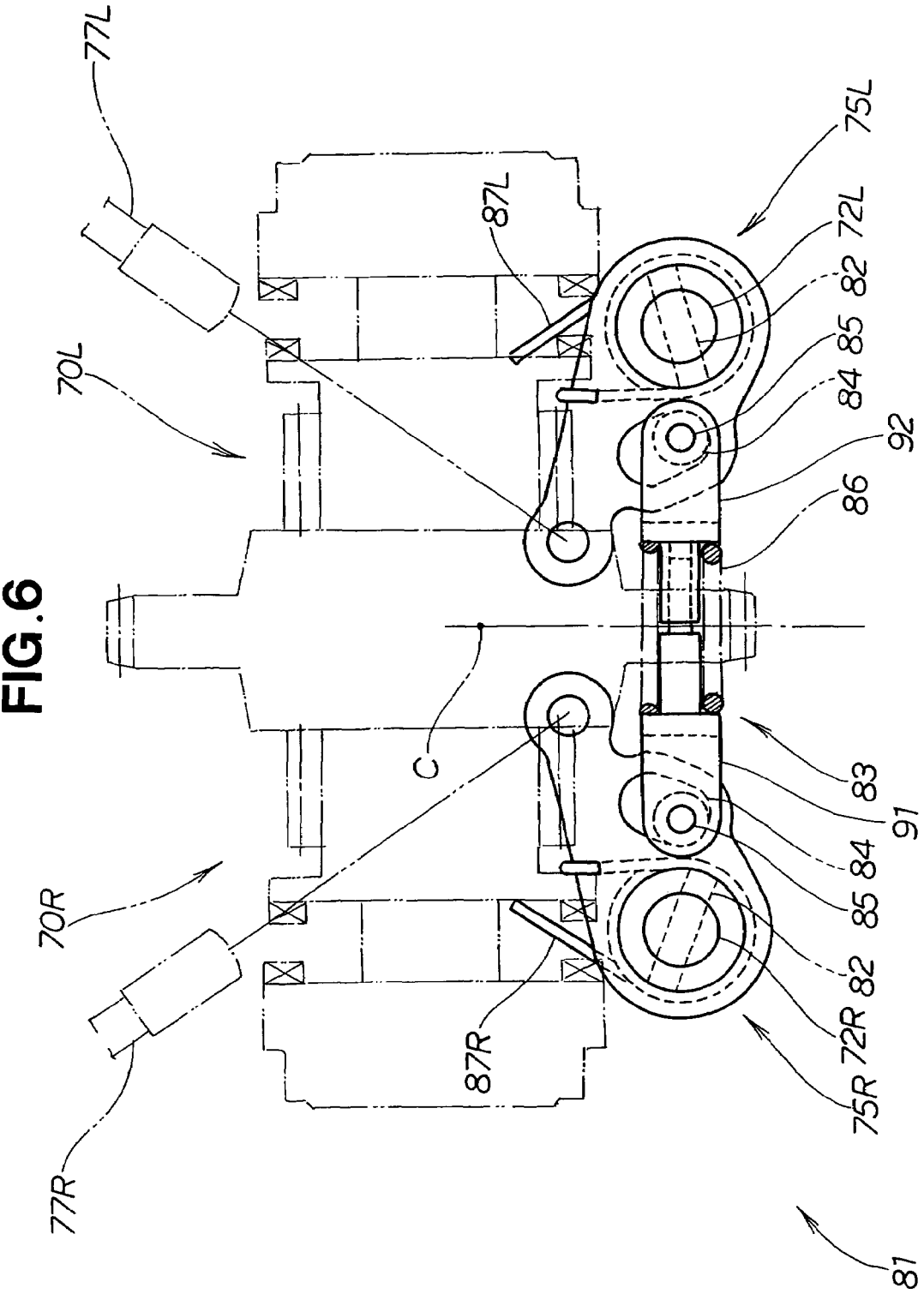
FIG. 6 is a plan view of an assist mechanism of the steering apparatus.

Referring to FIG. 6, the assist mechanism 81 includes the right and left clutch activating shafts 72R, 72L rotatable for swinging the right and left clutch arms 71R, 71L (FIG. 5) to selectively engage and disengage the right and left clutches 70R, 70L, right and left operational arm members 75R, 75L retained on the right and left clutch activating shafts 72R, 72L for rotating the right and left clutch activating shafts 72R, 72L, and right and left cam grooves 104R, 104L formed in the right and left operational arm members 75R, 75L, respectively.

The assist mechanism 81 also includes retaining pins 82, 82 (see FIG. 7, too) retaining the right and left operational arm members 75R, 75L on the right and left clutch activating shafts 72R, 72L, respectively, and a telescopic bar-shaped member 83 located between the right operational arm member 75R and the left operational arm member 75L.

The assist mechanism 81 further includes ball bearings 84, 84 supported by opposite ends of the bar-shaped member 83, support pins 85, 85 inserted within the ball bearings 84, 84 for supporting the ball bearings thereon, and a compression spring 86 disposed along a central axis of the bar-shaped member 83 for urging the bar-shaped member 83 in such a manner as to urge the right and left operational arm members 75R, 75L in directions away from each other.

The assist mechanism 81 further includes a right torsion spring 87R disposed on the transmission case 26 for urging the right operational arm member 75R and a left torsion springs 87L disposed on the transmission case 26 for urging the left operational arm member 75L. The assist mechanism 81 also includes a right cable 77R extending from a distal end of the right operational arm member 75R to the right operational lever 73R, and a left cable 77L extending from a distal end of the left operational arm member 75L to the left operational lever 73L.

Figure 7:
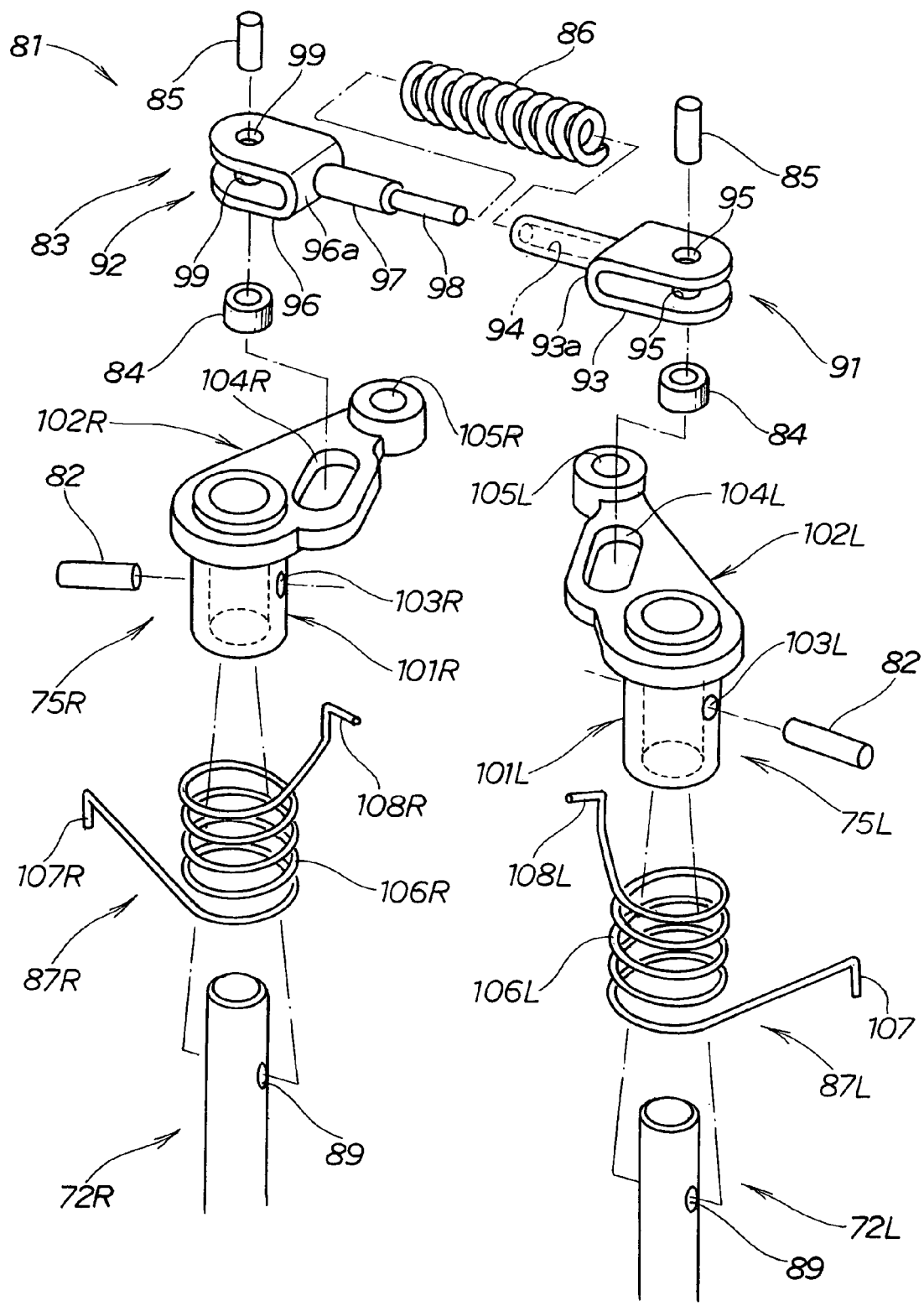
FIG. 7 is an exploded perspective view of the assist mechanism.

Turning to FIG. 7, the right clutch activating shaft 72R has a retaining hole 89 through which the retaining pin 82 is fitted for retaining the right operational arm member 75R on the right clutch activating shaft 72R. Similarly, the left clutch activating shaft 72L has a retaining hole 89 through which the retaining pin 82 is fitted for retaining the left operational arm member 75L on the left clutch activating shaft 72L.

The bar-shaped member 83 includes a left piece 91 for engagement with the left operational arm member 75L, and a right piece 92 for engagement with the right operational arm member 75R.

The left piece 91 has a U-shaped bearing support portion 93 supporting the ball bearing 84 through which the support pin 85 is inserted, and a pipe portion 94 extending from a bottom 93a of the bearing support portion 93. The bearing support portion 93 has holes 95, 95 formed therein for insertion of the support pin 85 therethrough.

The right piece 92 has a U-shaped bearing support portion 96 supporting the ball bearing 84 through which the support pin 85 is inserted, an extension portion 97 having an enlarged diameter and extending from a bottom 96a of the bearing support portion 96, and an extension portion 98 having a reduced diameter and extending from the extension portion 97. The extension portion 98 of reduced diameter is telescopically movably disposed within the pipe portion 94 of the left piece 91. The bearing support portion 96 has holes 99, 99 formed therein for insertion of the support pin 85 therethrough.

The extension portion 97 of enlarged diameter and the pipe portion 94 have their outer diameters approximately equal to an inner diameter of the compression spring 86 and act to prevent bending of the compression spring 86 when the compression spring 86 is compressed.

The left operational arm member 75L has a boss portion 101L retained on the clutch activating shaft 72L by the retaining pin 82, and an arm body 102L extending from the boss portion 101L perpendicularly to the boss portion 101L. The boss portion 101L has fitting holes 103L, 103L (only one shown) through which the retaining pin 82 is fitted for retaining the boss portion 101L on the clutch activating shaft 72L. The arm body 102L has a left cam groove 104L formed therein for allowing the ball bearing 84 to roll along the cam groove 104L. The arm body 102L has a cable attachment portion 105 to which the left cable 77L is attached.

The right operational arm member 75R is disposed in symmetric relation to the left operational arm member 75L. The operational arm member 75R has a boss portion 101R, an arm body 102R, fitting holes 103R, 103R (only one shown), a right cam groove 104R and a cable attachment portion 105R.

The right and left operational arm members 75R, 75L are provided symmetrically with respect to the central line C (as shown in FIG. 5) when the right and left clutches 70R, 70L are engaged. The right and left cam grooves 104R, 104L are also formed symmetrically with respect to the central line C. The right and left operational arm members 75R, 75L extend closely to each other towards the right and left cables 77R, 77L.

The left torsion spring 87L includes a body portion 106L fitted over the boss portion 101L of the left operational arm member 75L. The spring 87L has one end 107L supported by the transmission case 26 and an opposite end 108L engaging the arm body 102L of the left operational arm member 75L.

The right torsion spring 87R includes a body portion 106R fitted over the boss portion 111 of the right operational arm member 75R. The spring 87R has one end 107R supported by the transmission case 26 and an opposite end 108R engaging the arm body 102R of the right operational arm member 75R.

Referring again to FIG. 8, the steering apparatus 80 includes the right and left clutches 70R, 70L for transmitting rotation of the motive power source (engine) 14 to the right and left driving shafts 25, 25, the assist mechanism 81, and the right and left operational levers 73R, 73L for operating the right and left clutches 70R, 70L through the assist mechanism 81 to steer the machine body 11 of the working machine 10.

The right and left operational arm members 75R, 75L are mounted on the machine body 11 and connected to the right and left operational levers 73R, 73L, respectively, through the right and left cables 77R, 77L.

The right operational arm member 75R pivots when the right operational lever 73R is operated, thereby rotating the right clutch activating shaft 72R. The rotation of the clutch activating shaft 72R swings the right clutch arm 71R (FIG. 5) for selectively engaging and disengaging the right clutch 70R.

The left operational arm member 75L pivots when the left operational lever 73L is operated, thereby rotating the left clutch activating shaft 72L. The rotation of the clutch activating shaft 72L swings the left clutch arm 71L (FIG. 5) for selectively engaging and disengaging the left clutch 70L.

Within the right cam groove 104R, the ball bearing 84 (FIG. 6) is rollably disposed. Similarly, within the left cam groove 104L, the ball bearing 84 (FIG. 6) is rollably disposed.

The ball bearing can roll along the cam groove with a reduced coefficient of friction provided between the ball bearing and a wall of the cam groove.

Description will be made with reference to FIG. 9A through FIG. 9C as to how the assist mechanism 81 of the steering apparatus 80 operates when working machine 10 turns leftward.

Referring to FIG. 9A, the right and left clutches 70R, 70L are engaged. The ball bearings 84, 84 have their centers (centers of the support pins 85, 85) located on a straight line C1 interconnecting a point on which the right operational arm member 75R is to pivot and a point on which the left operational arm member 75L is to pivot. The compression spring 86 exerts urging forces a1, a1 directed along the line C1. The right and left operational arm members 75R, 75L and the bar-shaped member 83 located on the line C1 are maintained in a balanced state.

Referring to FIG. 9B, as indicated by an arrow a2, the left cable 77L is pulled by gripping of the left operational lever 73L (FIG. 8) to thereby cause the left operational arm member 75L to pivot as indicated by an arrow a3. At this time, a straight line C2 interconnecting the centers of the ball bearings 84, 84 comes out of coincidence with the straight line C1. The ball bearing 84 then rolls along the left cam groove 104L formed in the left operational arm member 75L.

Referring to FIG. 9C, the rolling movement of the ball bearing 84 and the urging of the compression spring 86 produce a turning force acting in such a direction as to turn the left operational arm member 75L as shown by an arrow a4 for assisting the pivotal movement of the left operational arm member 75L. Producing this turning force makes it possible for the left operational lever 73L to be gripped by a reduced force for pulling the cable 77L to cause the pivotal movement of the left operational arm member 75L. Thus, the left clutch 70L (FIG. 5) can be readily disengaged to allow the working machine 10 to turn leftward. The centers of the ball bearings 84, 84 are interconnected by a straight line C3 when the left operational arm member 75L pivots.

Description will be made with reference to FIG. 10A through FIG. 10C as to how the assist mechanism 81 of the steering apparatus 80 operates when the working machine 10 turns rightward.

Figure 10A:
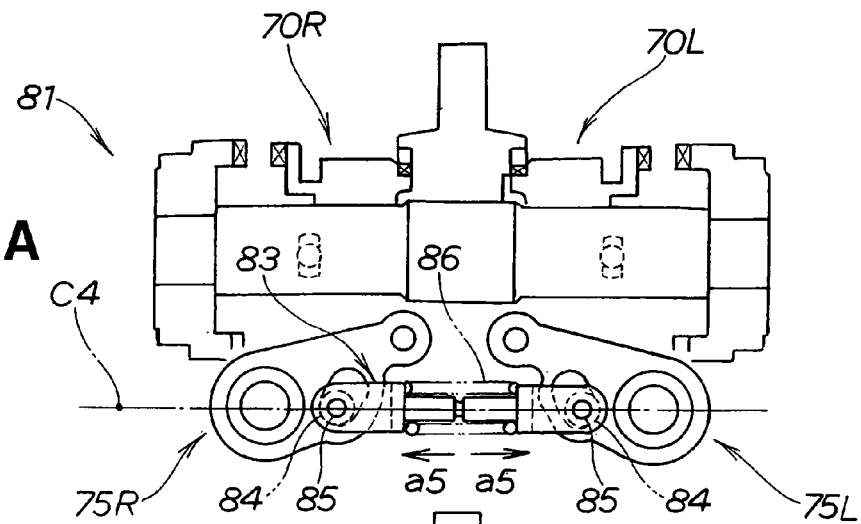
FIG. 10A through FIG. 10C are views showing an operation of the assist mechanism when the working machine turns rightward.

Referring to FIG. 10A, the right and left clutches 70R, 70L are engaged. The ball bearings 84, 84 have their centers (centers of the support pins 85, 85) located on a straight line C4 interconnecting the point on which the right operational arm member 75R is to pivot and the point on which the left operational arm member 75L is to pivot. The compression spring 86 exerts urging forces a5, a5 directed along the line C4. The right and left operational arm members 75R, 75L and the bar-shaped member 83 located on the line C4 are maintained in a balanced state.

Figure 10B:
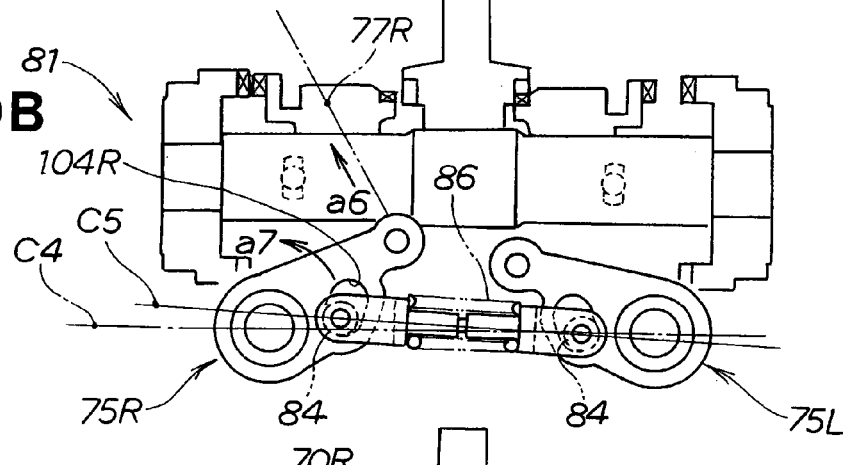

Referring to FIG. 10B, as indicated by an arrow a6, the right cable 77R is pulled by gripping of the right operational lever 73R (FIG. 8) to thereby cause the right operational arm member 75R to pivot as indicated by an arrow a7. At this time, a straight line C5 interconnecting the centers of the ball bearings 84, 84 comes out of coincidence with the straight line C4. The ball bearing 84 then rolls along the right cam groove 104R formed in the right operational arm member 75R.

Figure 10C:
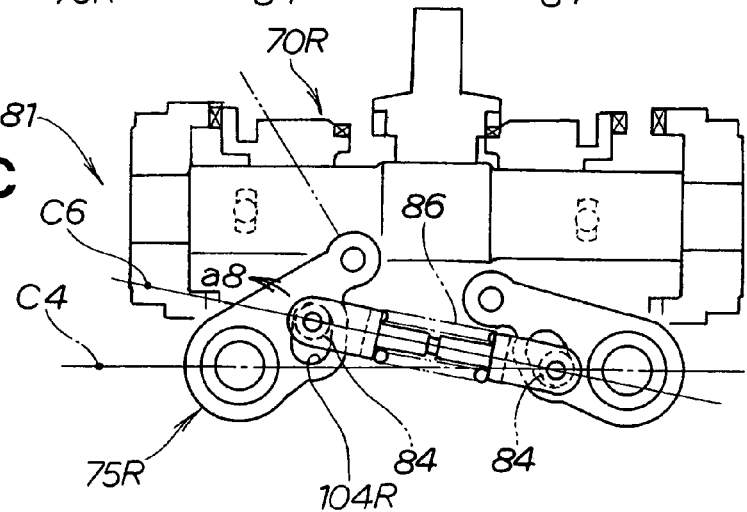

Referring to FIG. 10C, the rolling movement of the ball bearing 84 and the urging of the compression spring 86 produce a turning force acting in such a direction as to turn the right operational arm member 75R as shown by an arrow a8 for assisting the pivotal movement of the right operational arm member 75R. Producing this turning force makes it possible for the right operational lever 73R to be gripped by a reduced force for pulling the cable 77R to cause the pivotal movement of the right operational arm member 75R. Thus, the right clutch 70R (FIG. 5) can be readily disengaged to allow the working machine 10 to turn rightward. The centers of the ball bearings 84, 84 are interconnected by a straight line C6 when the right operational arm member 75R pivots.

Figure 11:
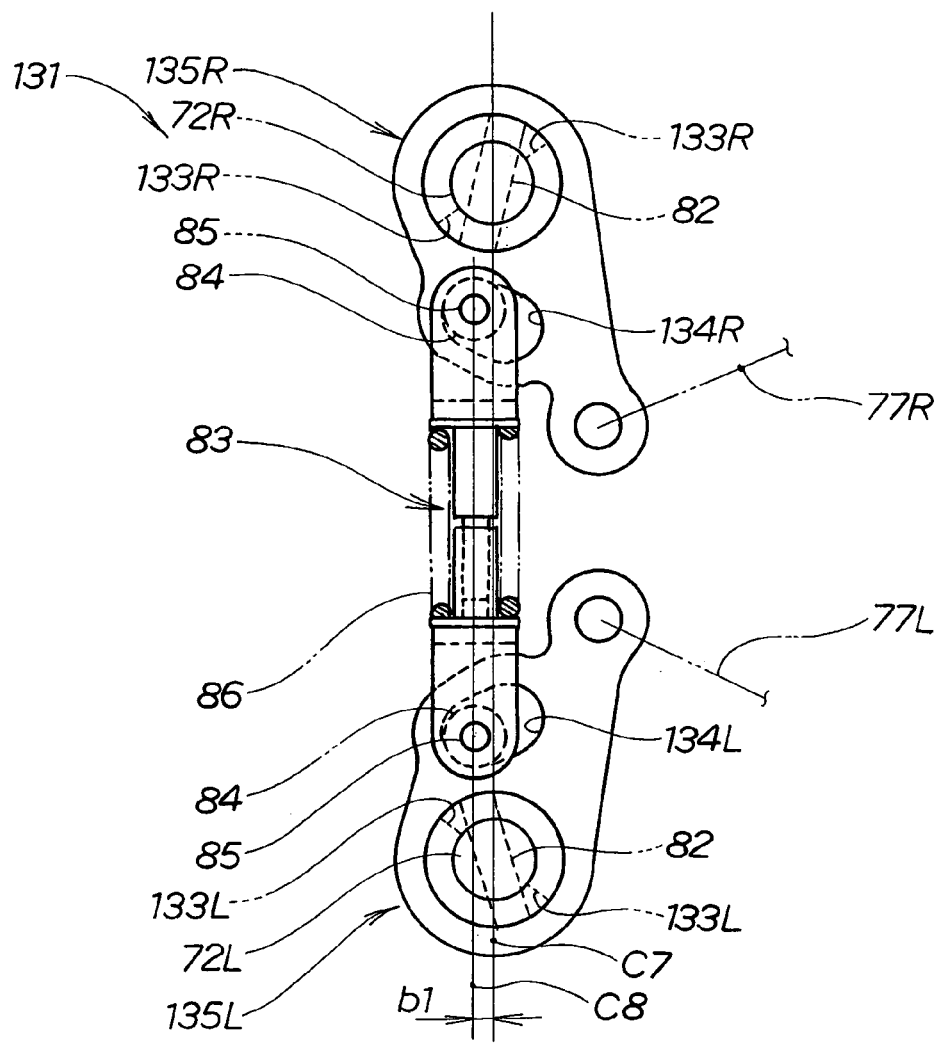
FIG. 11 is a plan view of a modified assist mechanism of the steering apparatus.
Figure 12:
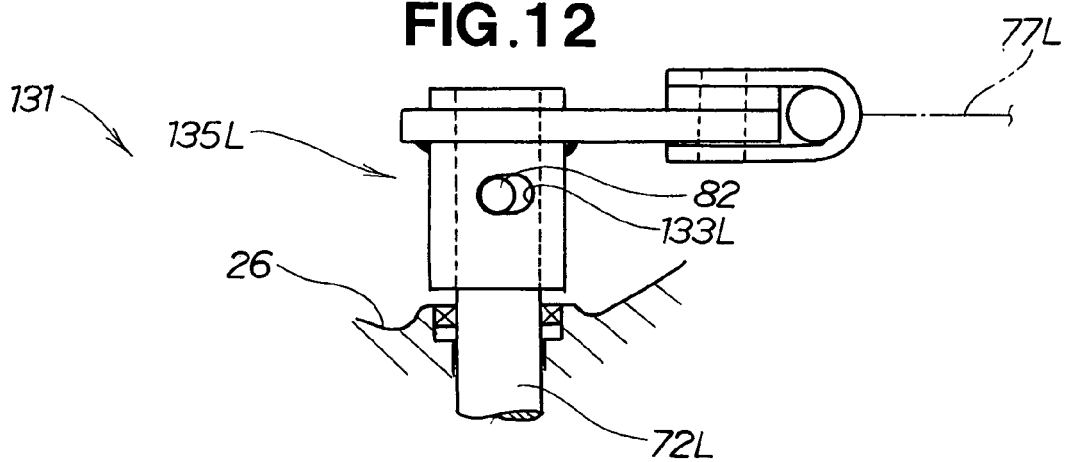
FIG. 12 is a side elevation view of the assist mechanism shown in FIG. 11.

Reference is made to FIG. 11. The steering apparatus 80 may include a modified assist mechanism 131 instead of the assist mechanism 81. Components of the assist mechanism 131 corresponding to components used in the assist mechanism 81 (FIG. 7) are denoted by the same reference numerals and will not be explained.

The assist mechanism 131 includes the right and left clutch activating shafts 72R, 72L, right and left operational arm members 135R, 135L, retaining pins 82, 82, the bar-shaped member 83, the ball bearings 84, 84, the support pins 85, 85, the compression spring 86 and the right and left cables 77R, 77L. The left operational arm member 135L has elongated holes 133L, 133L through which the retaining pin 82 is loosely fitted. The right operational arm member 135R has elongated holes 133R, 133R through which the retaining pin 82 is loosely fitted. The right and left operational arm members 135R, 135L have right and left cam grooves 134R, 134L formed therein, respectively.

Provision of the elongated holes 133R, 133R, 133L, 133L allows a straight line C8 interconnecting the centers of the ball bearings 84, 84 to be offset or displaced an interval b1 from a straight line C7 interconnecting a point on which the right operational arm member 135R is to pivot and a point on which the left operational arm member 135L is to pivot. This arrangement ensures that the right and left operational arm members 135R, 135L are held in an initial state where the right and left clutches 70R, 70L are engaged, thereby enabling the assist mechanism 131 to perform a stable operation.

Figure 13:
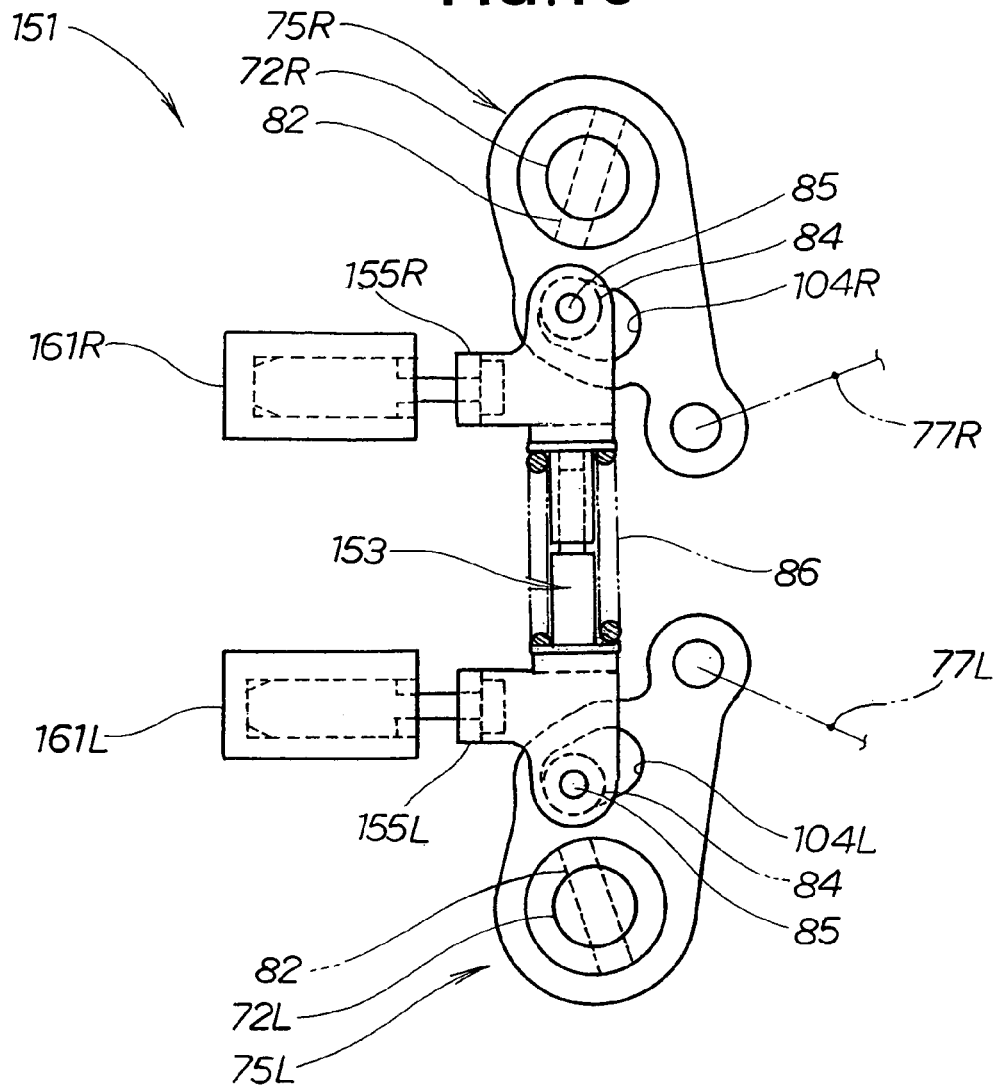
FIG. 13 is a plan view of a further modified assist mechanism of the steering apparatus.

Turning to FIG. 13, there is shown a further modified assist mechanism 151. Components of the assist mechanism 151 corresponding to components used in the assist mechanism 81 are denoted by the same reference numerals and will not be discussed.

The assist mechanism 151 includes the right and left clutch activating shafts 72R, 72L, the right and left operational arm members 75R, 75L, the retaining pins 82, 82, a telescopic bar-shaped member 153, the ball bearings 84, 84, the support pins 85, 85, the right and left cables 77R, 77L and right and left plungers 161R, 161L provided for returning the right operational arm member 75R to an initial state where the right clutch is engaged and for returning the left operational arm member 75L to an initial state where the left clutch is engaged.

The bar-shaped member 153 has a right plunger engagement portion 155R formed at a right end thereof for engagement with the right plunger 161R. The bar-shaped member 153 has a left plunger engagement portion 155L formed at a left end thereof for engagement with the left plunger 161L.

Figure 14:
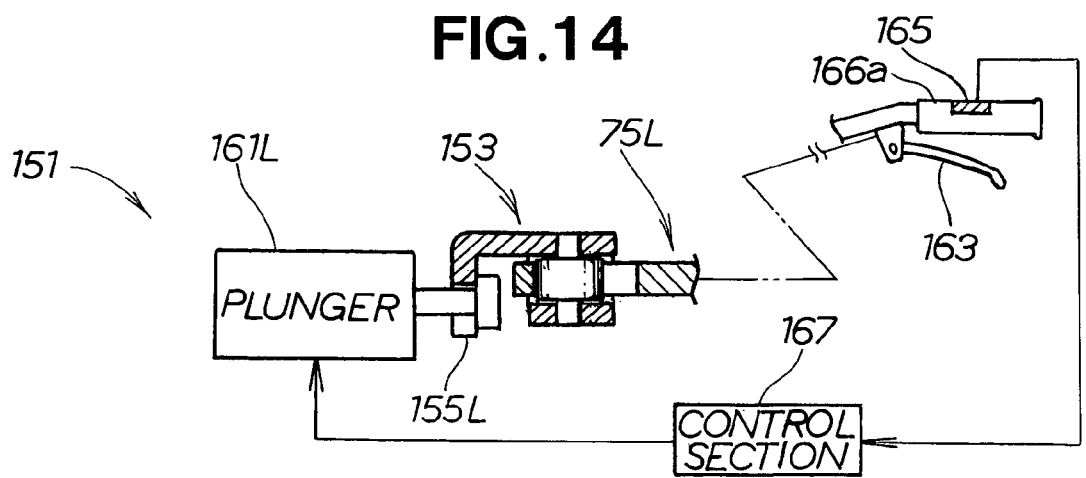
FIG. 14 is a view showing partly in cross-section the assist mechanism shown in FIG. 13 with a pressure sensitive sensor and a control section provided.
Figure 15:
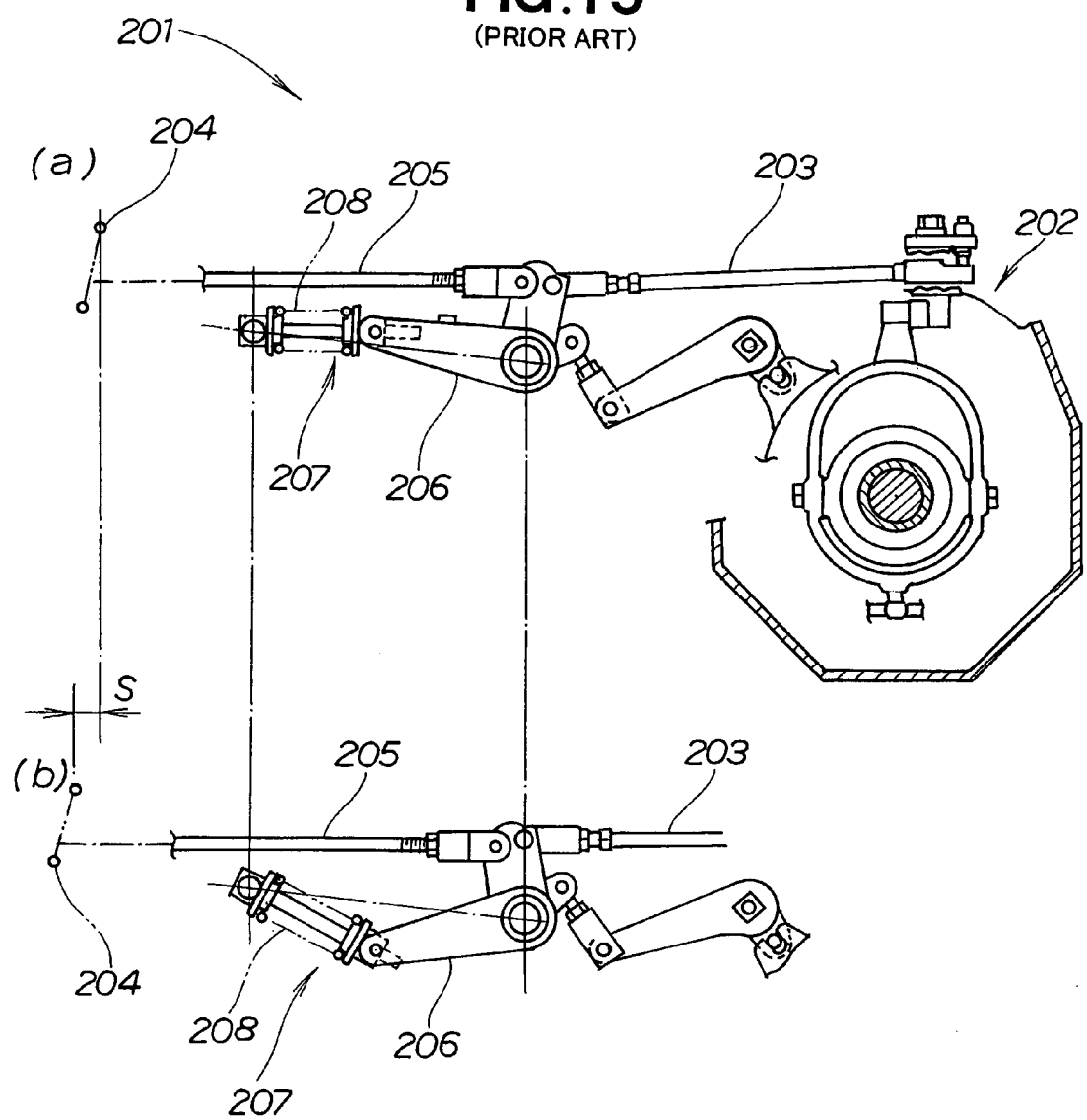
FIG. 15 illustrates an operation of a conventional assist mechanism of a steering apparatus of a working machine.

As shown in FIG. 14, the assist mechanism 151 may, for example, include a pressure sensitive sensor 165 embedded in a left handle grip 166a, and a control section 167 for controlling the left plunger 161L. The sensor 165 senses pressure exerted on the grip 166a when an operator holds a left operational lever (a left operational member) 163 and the grip 166a together, and senses no pressure exerted on the grip 166a when the operator releases the operational lever 163 and the grip 166a. When the operator releases the operational lever 163, the control section 167 turns on the plunger 161L (FIG. 13) to return the left operational arm member 75L to the initial state for engaging the left clutch 70L.

It is to be understood that the assist mechanism 151 includes a pressure sensitive sensor at a right handle grip (not shown) identical in arrangement to the left handle grip 166a. The sensor provided at the right handle grip operates in the same manner as the sensor 165. That is, when the operator releases a right operational lever (not shown) and the right handle grip, the control section 167 turns on the plunger 161R (FIG. 13) to return the right operational arm member 75R to the initial state for engaging the right clutch 70R.

Although, as shown in FIG. 7, the bar-shaped member 83 is equipped with the ball bearings 84, 84, it may be provided with rollers or roller bearings rollably disposed within the right and left cam grooves.

The steering apparatus according to the present invention is suitable for a working machine arranged to turn rightward or leftward when transmission of a motive power from a motive power source to a right or left crawler belt is cut off.

Obviously, various minor changes and modifications of the present invention are possible in the light of the above teaching. It is therefore to be understood that within the scope of the appended claims the invention may be practiced otherwise than as specifically described.

What is claimed is:

1. A steering apparatus for a working machine having a machine body, a motive power source and right and left driving shafts, the steering apparatus comprising:
   right and left clutches for transmitting rotation of the motive power source to the right and left driving shafts;
   an assist mechanism;
   right and left operational members for operating the right and left clutches, respectively, through the assist mechanism to steer the machine body of the working machine;
   the assist mechanism including:
      right and left operational arm members mounted on the machine body and connected to the right and left operational members, respectively, such that the right operational arm member pivots for selectively engaging and disengaging the right clutch when the right operational member is operated and the left operational arm member pivots for selectively engaging and disengaging the left clutch when the left operational member is operated;
      right and left cam grooves formed in the right and left operational arm members, respectively;
      a movable bar-shaped member having opposite ends disposed within the right and left cam grooves, respectively; and
      a compression spring disposed along a central axis of the bar-shaped member for urging the right and left operational arm members in directions away from each other,
      wherein, when one of the right and left operational members is operated, one of the right and left operational arm members, connected to the one of the right and left operational members, undergoes a pivotal movement to cause the bar-shaped member to undergo a movement along one of the right and left cam grooves formed in the one of the right and left operational arm members, the movement of the bar-shaped member and the urging of the compression spring assisting the pivotal movement of the one of the right and left operational arm members.

2. A steering apparatus according to claim 1, wherein each of the opposite ends of the bar-shaped member is provided with one of a roller and a ball bearing.

3. A steering apparatus according to claim 1, wherein the assist mechanism further includes right and left cables interconnecting the right operational member and the right operational arm member and interconnecting the left operational member and the left operational arm member.

* * * * *